US011962565B1

(12) United States Patent
Pathak et al.

(10) Patent No.: US 11,962,565 B1
(45) Date of Patent: Apr. 16, 2024

(54) GENERATING SERVICE-TO-SERVICE DEPENDENCY MAP FROM DNS AND FLEET MANAGEMENT SYSTEM LOGS

(71) Applicant: Microsoft Technology Licensing, LLC, Redmond, WA (US)

(72) Inventors: Abhishek Pathak, Woodinville, WA (US); Sorabh Kumar Gandhi, Bellevue, WA (US); Craig Henry Wittenberg, Clyde Hill, WA (US); Ming Hao, Bellevue, WA (US); Rohit Sanjay Galwankar, Redmond, WA (US); Vivek Sanjeev Tejwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/066,527

(22) Filed: Dec. 15, 2022

(51) Int. Cl.
*H04L 12/46* (2006.01)
*H04L 61/3015* (2022.01)
*H04L 61/4511* (2022.01)
*H04L 61/5007* (2022.01)

(52) U.S. Cl.
CPC ...... *H04L 61/4511* (2022.05); *H04L 61/3025* (2013.01); *H04L 61/5007* (2022.05)

(58) Field of Classification Search
None
See application file for complete search history.

(56) References Cited

U.S. PATENT DOCUMENTS

| 9,450,700 | B1 * | 9/2016 | Van Tonder | H04L 41/046 |
| 10,637,889 | B2 * | 4/2020 | Ermagan | H04L 63/0428 |
| 10,931,786 | B1 * | 2/2021 | Vasquez | H04L 41/0893 |
| 2016/0255047 | A1 * | 9/2016 | Parthasarathy | H04L 61/3025 709/245 |
| 2016/0359705 | A1 | 12/2016 | Parandehgheibi | |
| 2019/0058718 | A1 | 2/2019 | Pangeni et al. | |
| 2020/0076701 | A1 | 3/2020 | Gershaft et al. | |
| 2020/0296007 | A1 | 9/2020 | Finn, II | |

FOREIGN PATENT DOCUMENTS

CN 109983752 A * 7/2019 ............. H04L 45/20

OTHER PUBLICATIONS

"Four Pillars of Kubernetes Fleet Management," Retrieved from the Internet: URL: https://rafay.co/the-kubernetes-current/fourpillars-ofkubernetes-fleet-management/, Feb. 14, 2024, 06 Pages.
International Search Report and Written Opinion received for PCT Application No. PCT/US2023/036832, Feb. 22, 2024, 13 pages.

* cited by examiner

*Primary Examiner* — Christopher B Robinson
(74) *Attorney, Agent, or Firm* — Alleman Hall & Tuttle LLP

(57) ABSTRACT

A computing system is provided, including a processor and memory storing instructions that cause the processor to execute a domain name service (DNS) log analyzer configured to identify a container identifier associated with a DNS request and a destination IP address associated with a DNS response to the DNS request, using one or more DNS logs, a fleet management system record analyzer configured to identify a first service associated with the container identifier and a second service associated with the destination IP address, using one or more fleet management system logs, and a dependency map generator configured to generate a service-to-service dependency map between the identified first service and the identified second service.

20 Claims, 11 Drawing Sheets

GEOGRAPHIC SCOPE OF DEPENDENT SERVICES 68C
(SERVICE TO GEOGRAPHIC REGION MAP)

| DEPENDENT SERVICES | GEOGRAPHIC REGION | | | | | | | |
|---|---|---|---|---|---|---|---|---|
| | EuropeNorth | EuropeWest | USCentral | USEast | USSouth | USWest | USWest2 | USWestCentral |
| Key Vault Service | | | | | | | | |
| Container Management Service | | | X | | | | | |
| Profiler Service | | | | | | | | |
| Resource Manager | | | | | | X | | |
| Protection Service | | | | X | | X | | |
| Diagnostics Service | | | | | | X | X | |
| Real Time Data Analytics Service | | | | | | | | |
| Master Data Management Service | | X | X | | X | X | X | X |
| Directory Service | | | | | | | | |
| Security Response Service | | | | | | X | | |
| Service Bus | | | | | | | | |
| Database Cluster Service | | | | | | | | |

FIG. 8

GENERATING SERVICE-TO-SERVICE DEPENDENCY MAP FROM DNS AND FLEET MANAGEMENT SYSTEM LOGS

BACKGROUND

Modern distributed computing systems include large numbers of servers located at data centers around the world, which communicate with each other across computer networks. Such distributed computing systems offer a plethora of software services that enable developers to develop, configure, deploy and maintain cloud applications in virtualized environments. A program executed on a particular server can communicate with various of these services executed on other servers, and those services in turn may communicate with other services on yet different servers, and so on. Such communications create dependencies among these services. A failure in one service can affect all services that depend on it. The web of dependencies between such services, and the attendant risks of potential faults due to dependency failures, are exceedingly large in modern distributed computing systems.

SUMMARY

A computing system is provided, including a processor and memory storing instructions that cause the processor to execute a domain name service (DNS) log analyzer configured to identify a container identifier associated with a DNS request and a destination IP address associated with a DNS response to the DNS request, using one or more DNS logs, a fleet management system record analyzer configured to identify a first service associated with the container identifier and a second service associated with the destination IP address, using one or more fleet management system logs, and a dependency map generator configured to generate a service-to-service dependency map between the identified first service and the identified second service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 shows an example of a geographic scope of dependent services created based on a service-to-service dependency map by the computing system of FIG. 1.

DETAILED DESCRIPTION

In a modern globally distributed computing system, millions of servers positioned in data centers distributed throughout various geographic regions may generate billions of service-to-service communications per hour. These communications represent dependencies between the requesting service and the service responding to the request. As discussed above, challenges exist to determining service-to-service dependencies. These dependencies vary over time, and their ephemeral existence makes them difficult to track. The sheer volume of such requests also makes them difficult to track. Privacy and security measures also make it difficult to track such dependencies. Further complicating matters, virtualization through container architectures or hypervisor architectures as described herein, also makes it difficult to track such dependencies. Without an accurate service-to-service dependency map, functions of the platform can be compromised. For example, the true cause of a service outage may remain undiagnosed, crashed services may be brought back online in an incorrect order generating dependency failures, or legally or contractually determined obligations to house data and services in defined geographic regions can be difficult to meet and verifiable compliance reports can prove difficult to generate.

Figure 1:
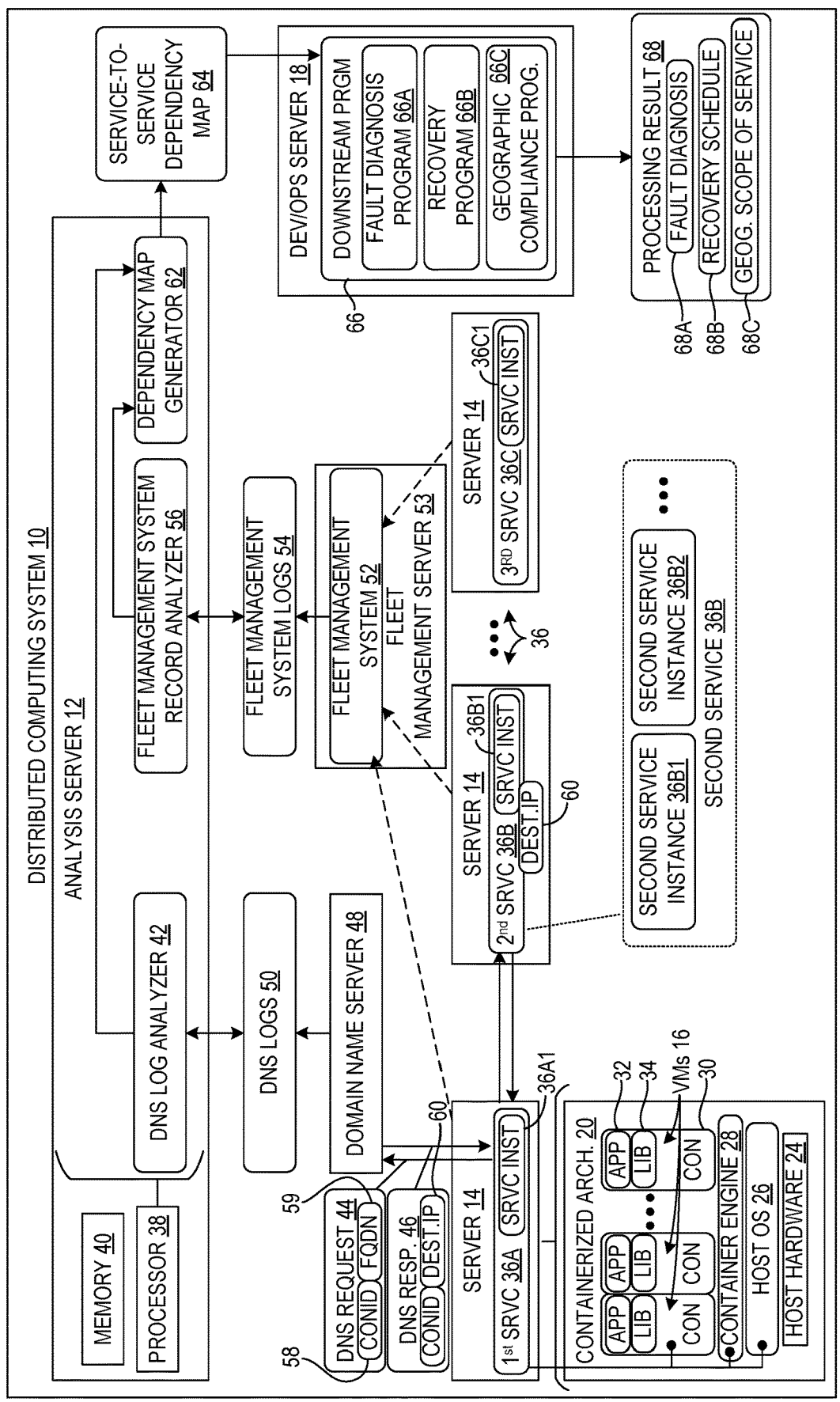
FIG. 1 shows a schematic view of a distributed computing system for use in creating a service-to-service dependency map from domain name server (DNS) logs and fleet management system logs, according to one example implementation that utilizes servers with containerized architectures.
Figure 2:
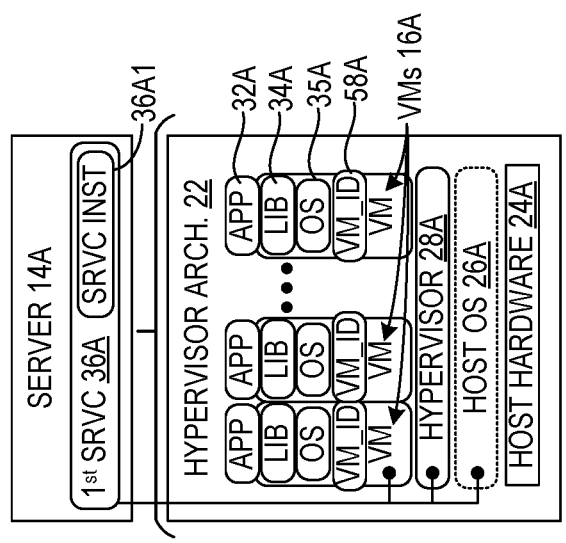
FIG. 2 shows a server with a hypervisor architecture, which may be used as an alternative to the containerized architecture of FIG. 1.

To address these issues, with reference to FIG. 1, a distributed computing system 10 is provided for use in creating a service-to-service dependency map from domain name server (DNS) logs and fleet management system logs, according to one example implementation. Computing system 10 includes an analysis server 12 configured to communicate over one or more computer networks with managed servers 14 implementing virtual machines (VMs) 16, and with a development and operations (Dev/Ops) server 18. The virtual machines 16 implemented by each server 14 may be implemented using a containerized architecture 20, as shown in FIG. 1, or a hypervisor architecture 22 as shown in FIG. 2. Continuing with FIG. 1, in the containerized architecture 20, a host operating system 26 is executed on host hardware 24 (e.g., processor, accelerator hardware, non-volatile storage memory, and volatile memory), along with an instance of a container engine 28. The container engine 28 provides a software interface between the host OS and one or more containers 30. Each container 30 includes respective application programs 32 and libraries 34 and binaries and other data used by the applications. In this way, each container 30 implements a containerized virtual machine 16 within the container.

Turning briefly to FIG. 2, alternatively, server 14 may implement virtualization using a hypervisor architecture 22, which includes a hypervisor 28A executed on a host OS 26A, which in turn is executed on host hardware 24A including a processor and memory. The hypervisor 28A provides a software interface between the host OS 26A and external hypervisor control plane servers, as well as individual virtual machines 16A. Each virtual machine 16A includes a guest OS instance 35A, as well as libraries 34A, binaries, and other data used by applications 32A executed within the hypervised virtual machine 16A. In some implementations host OS 26A may be omitted.

When applications are executed in such virtualized environments as the containerized architecture 20 or the hypervisor architecture 22, various services 36 of the distributed computed system can be called, illustrated schematically as first service 36A, second service 36B and third service 36C. These services 36 can be called by the applications, libraries, or binaries executed in the virtual machines 16, 16A, or by the container engine 28/hypervisor 28A and/or by the host OS 26, 26A in response to requests by software components in the virtual machines 16, 16A. It will be appreciated that for each of first through third services 36A, 36B, 36C, a corresponding service instance 36A1, 36B1, 36C1 is instantiated on the servers 14, in response to the requests by the virtual machines 16, 16A. Further, service instances 36A1-36C1 communicate with each other and other service instances within the distributed computing system 10, over computer networks. As illustrated by second service 36B shown in dashed lines, each service 36 can include a plurality of service instances executed on servers across the distributed computing network.

Figure 3:
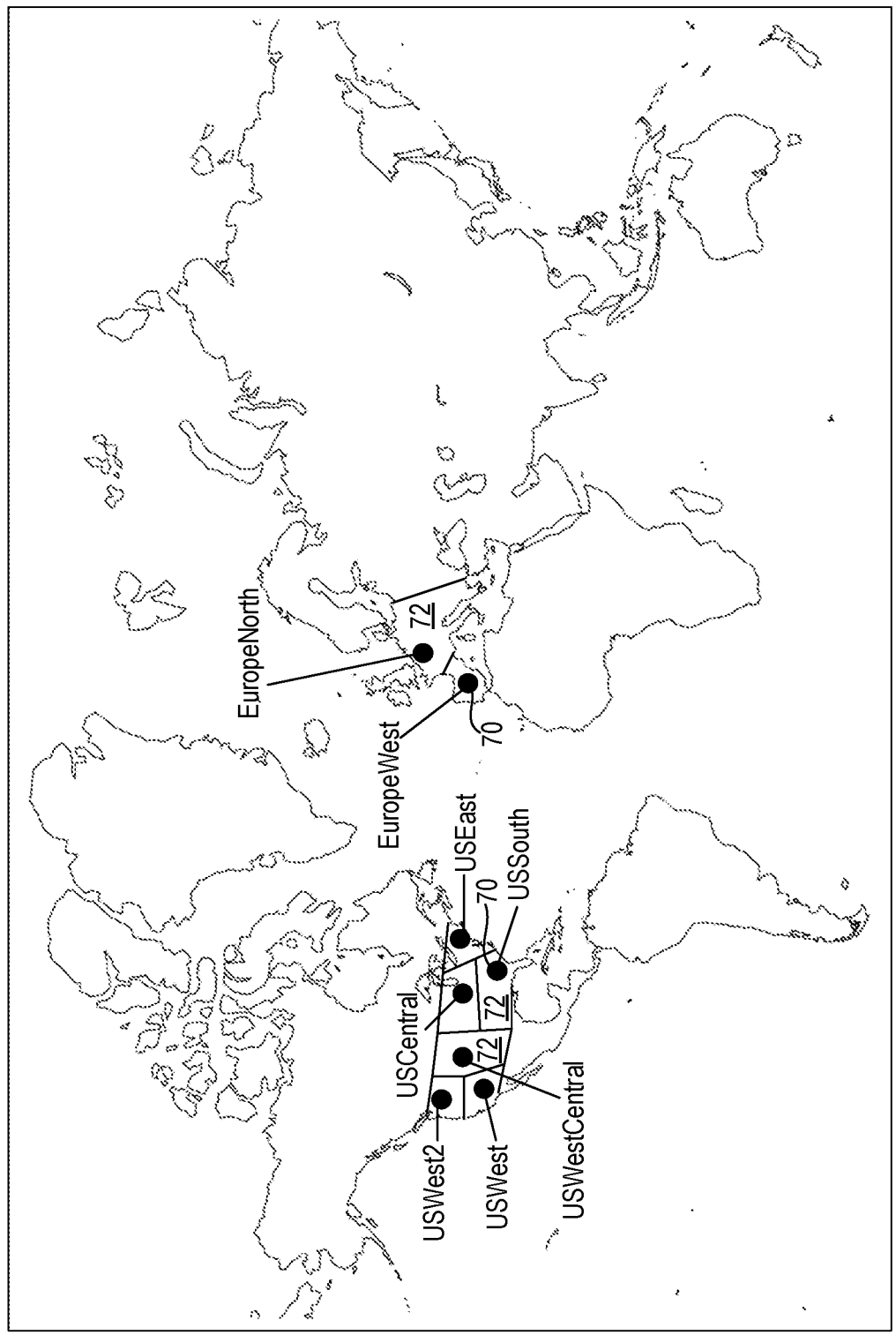
FIG. 3 shows geographic regions in which servers of the distributed computing system of FIG. 1 are deployed, in one example.

In a large deployment of a distributed computing system 10, millions of servers 14 may be provided, and billions of requests per hour may flow between service instances 36A. With such a large and complicated flow of communications, a significant technical challenge exists to monitor dependencies among services. Further, as shown in FIG. 3, the servers 14 of computing system 10 may be located in data centers 70 located in different geographic regions 72. Each of the geographic regions may be subject to different regulatory requirements for the processing and storage of data, including restrictions on the geographic location of data processing and storage of such data. Since data may flow along the dependencies between services, determining that processing of such data is compliant with regulations that restrict geographic scope of data processing and storage in this manner presents a technical challenge. Further, the technical challenge of diagnosing the true origin of a fault in a particular service, and generating a recovery schedule for bringing services that depend on each other back online is complicated in such complex distributed systems.

To address these technical challenges, the computing system 10 includes an analysis server 12. The analysis server 12 includes a processor 38 and memory 40 storing instructions that cause the processor 32 to execute a domain name service (DNS) log analyzer 42 configured to identify a source identifier, such as a source container identifier 58 or source virtual machine identifier 58A (see FIG. 2), associated with a DNS request 44 sent to a DNS server 48. In one example, within the environment of the distributed computing system 10, the source container identifier 58, like all container identifiers, is a globally unique identifier (GUID) that uniquely identifies a virtual machine 16. Thus there is a 1:1 relationship between container identifiers and virtual machines 16. The DNS request also includes a fully qualified domain name (FQDN) 59 for a service executed at a destination server 14. In one embodiment, the DNS server 48 may be configured to be a recursive resolver that resolves a FQDN to an IP address. The IP address for the destination may be either an IPv4 or IPv6 address, for example. The DNS server 48 can fully resolve the FQDN 59 into a destination IP address 60, which is returned to the requesting server 14 in a DNS response 46. The DNS log analyzer 42 is also configured to identify the destination IP address 60 associated with a DNS response 46 to the DNS request 44, using one or more DNS logs of the DNS server 48. It will be appreciated that in addition to the DNS requests 44 and DNS responses 46 themselves, metadata such as the source container identifier 58 or virtual machine identifier 58A (see FIG. 2) are typically logged in the DNS logs 50, as explained in more detail below with reference to FIG. 4.

Continuing with FIG. 1, distributed computing system 10 further includes a fleet management system 52, which is a software application typically executed on a dedicated fleet management server 53 or set of fleet management servers 53 and configured to gather telemetry information regarding a fleet of virtual machines implemented on each of the managed servers 14. In one particular example, the fleet management system 52 may be the AZURE® Fleet Insights and Management system offered by MICROSOFT® Corporation. Other similar systems may also be adopted for other distributed computing system environments. A log analytics agent program executed on each server 14 is configured to upload information regarding VM usage on each server 14 to the fleet management system 52. This information is logged by the fleet management system 52 in fleet management system logs 54.

Distributed computing system 10 further includes a fleet management system record analyzer 56 executed by the analysis server 12, and configured to analyze data records in the fleet management system logs 54. The fleet management system record analyzer 56 is a software application configured to identify a first service 36A associated with the source identifier (e.g., container identifier 58 or virtual machine identifier 58A) and a second service 36A associated with the destination IP address 60, using one or more of the fleet management system logs 54. The analysis server 12 is further configured to execute a dependency map generator 62, which is a software application configured to generate a service-to-service dependency map 64 between the identified first service 36A1 and the identified second service 36A2.

Figure 6:
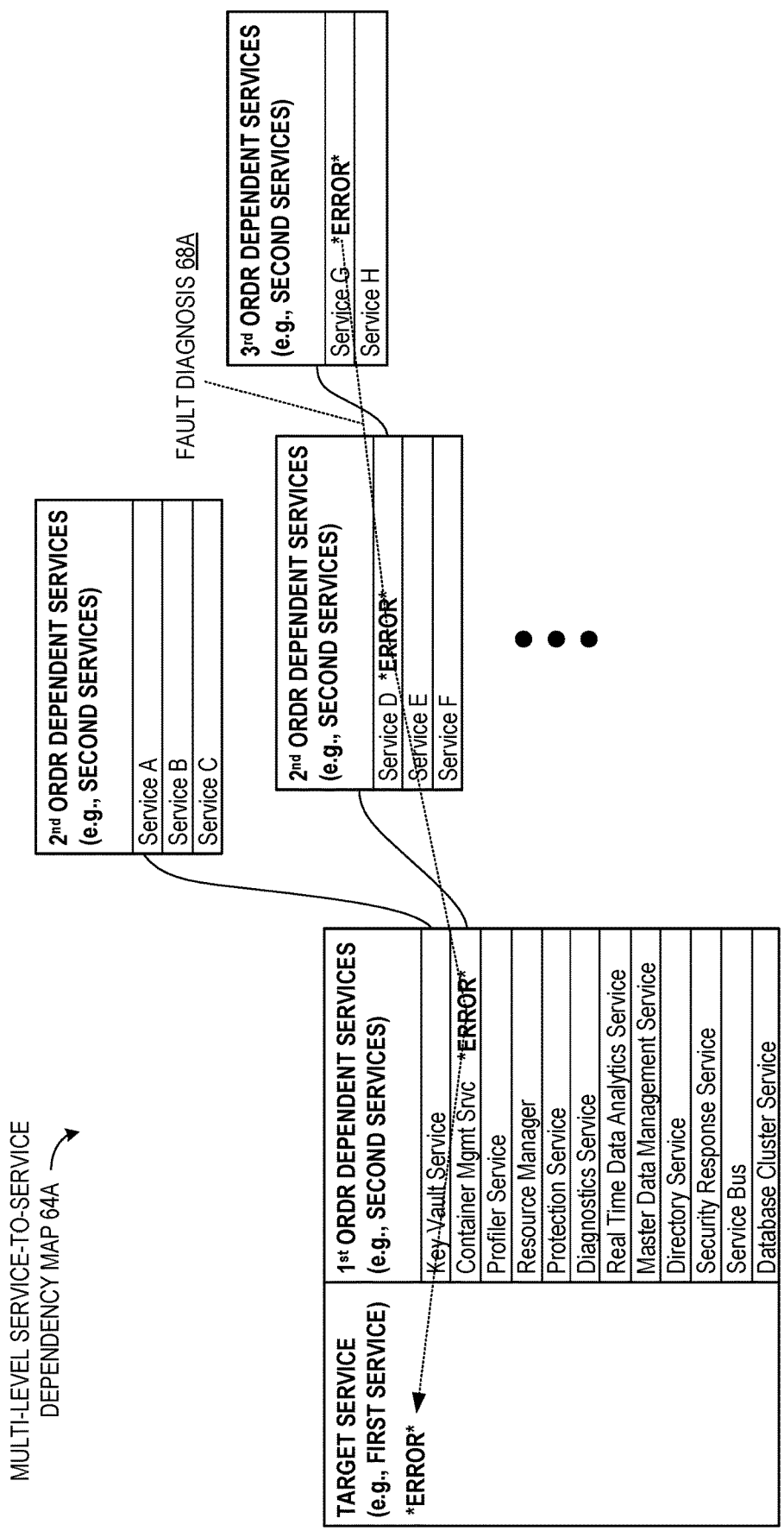
FIG. 6 shows an example multi-level service-to-service dependency map created by the computing system of FIG. 1, with a fault diagnosis created based on the service-to-service dependency map.
Figure 7:
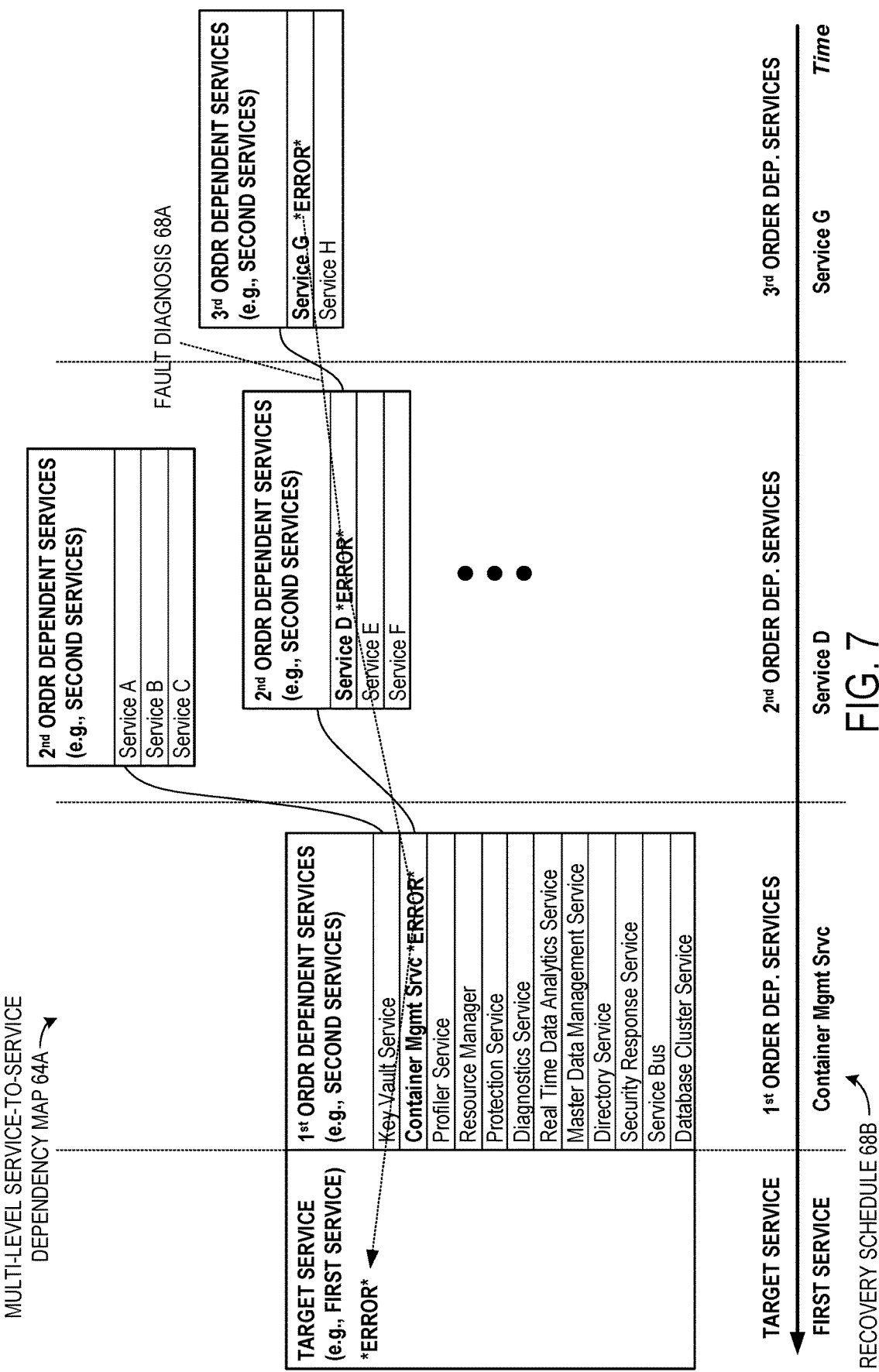
FIG. 7 shows an example multi-level service-to-service dependency map created by the computing system of FIG. 1, with a recovery schedule created based on the service-to-service dependency map.

The dependency map generator 62 is configured to output the service-to-service dependency map 64 to a downstream computing program 66 executed on Dev/Ops server 18 (or other server) for a processing operation. The downstream computing program 66 can be a fault diagnosis program 66A, recovery program 66B, or a geographic compliance program 66C, for example. Other types of downstream computing programs 66 are also contemplated. The downstream computing program 66 is configured to process the service-to-service dependency map 64 via a processing operation to thereby generate and output a processing result 68. The fault diagnosis program 66A can be configured to generate a fault diagnosis 68A based on the service-to-service dependency map 64 as the processing result 68. The recovery program 64B can be configured to compute a recovery schedule 66B for restarting services based on the service-to-service dependency map 64 as the processing result. The geographic compliance program 64C can be configured to determine a geographic scope 66C of a location of servers executing the first service 36A1 and the second service 36A2 as the processing result. Additional orders of dependency, discussed below, may also be included in the processing result 68. Examples of the fault diagnosis 68A, recovery schedule 68B and geographic scope of services 68C are illustrated in FIGS. 6-8, discussed below.

Figure 4:
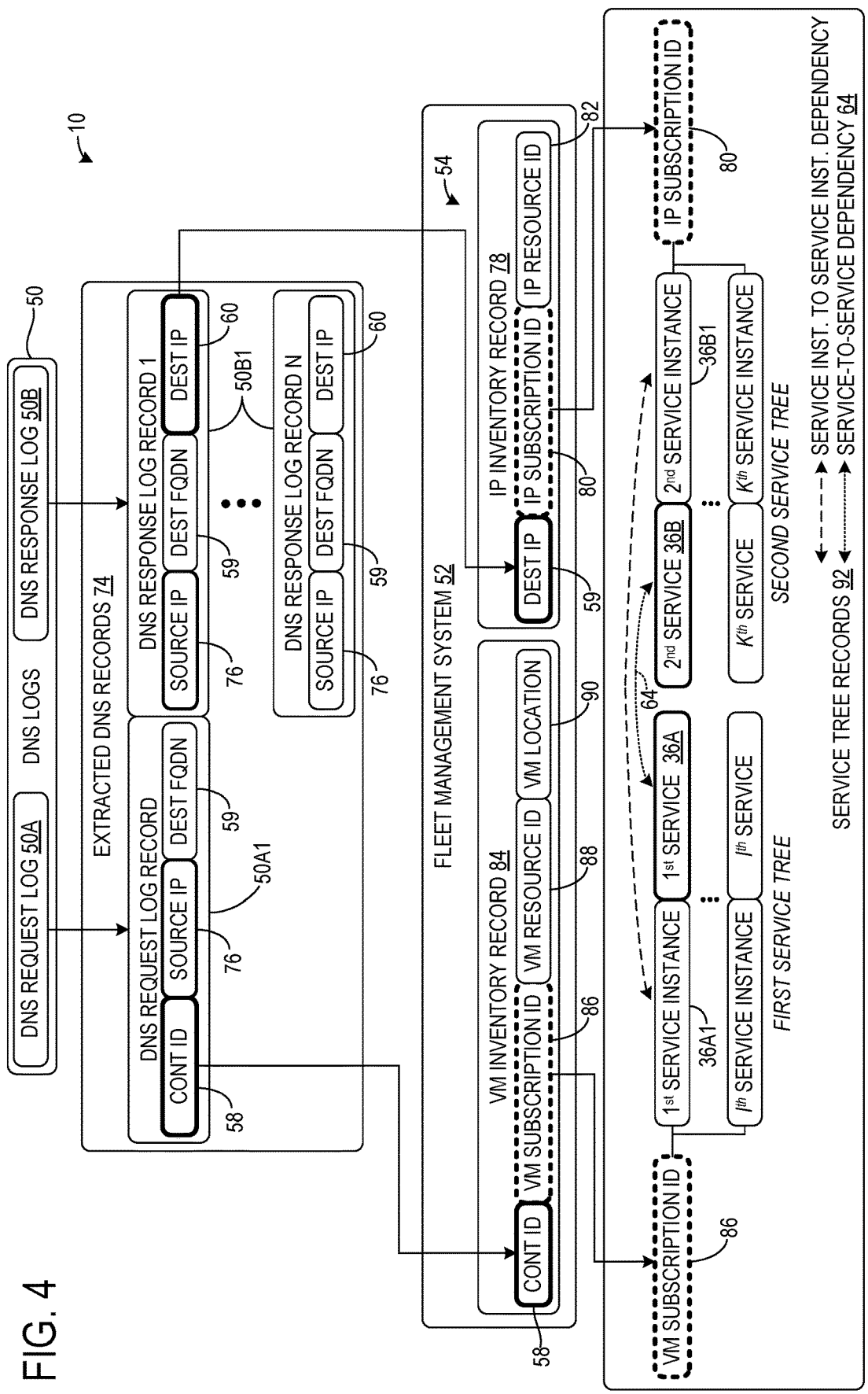
FIG. 4 shows example DNS log records and fleet management system records utilized to create the service-to-service dependency map by the distributed computing system of FIG. 1.

Turning now to FIG. 4, a data relationship diagram is shown, illustrating in detail the steps undertaken by the analysis server 12 to process the DNS logs 50 and fleet management system logs 54 to generate the server-to-service dependency 64, when the source identifier is a source container identifier 58. The DNS log analyzer 42 is configured to extract DNS records 74, which include a DNS request log record 50A1 from the DNS request log 50A and one to N DNS response log records 50B1 associated with the DNS request log record 50A1. The DNS log analyzer 42 is configured to identify the source container identifier 58 at least in part by identifying, within the DNS request log 50A of the one or more DNS logs 50, the DNS request log record 50A1 for the DNS request 44 (shown in FIG. 1), the DNS log record 50A1 including the source container identifier 58, a source internet protocol (IP) address 76, and a destination fully qualified domain name (FQDN) 59. As describe above in relation to FIG. 1, the source container identifier 58 is associated with a source container 30 implementing a VM 16 on a computer, such as server 14, that has been assigned the source IP address 76.

Continuing with FIG. 4, the DNS log analyzer 42 (of FIG. 1) is further configured to identify the source container identifier 58 at least in part by identifying within records from a DNS response log 50B of the one or more DNS logs 50, a DNS response log record 50B1 for a DNS response 46 (See FIG. 1) to the DNS request 44, the DNS response log record 50B1 including the source container identifier 76, and a destination IP address 60 included in the DNS response 46.

Continuing with FIG. 4, the fleet management system record analyzer 56 (of FIG. 1) is configured to identify the first service 36A and the second service 36B at least in part by identifying, via an IP inventory database of the fleet management system 52, an IP inventory record 78 including the destination IP address 58 and an IP subscription identifier 80. The IP inventory record 78 may also include an resource identifier 82. The resource identifier is unique to the virtual machine that has been assigned the IP address, and may be encode a GUID for the virtual machine, subscriptions associated with the resource, as well as resource groups that the resource is associated with.

Continuing with FIG. 4, the fleet management system record analyzer 56 (of FIG. 1) is further configured to identify the first service 36A and the second service 36B at least in part by identifying, via a VM inventory database of the fleet management system 52, a VM inventory record 84 including the container identifier 58 and a VM subscription identifier 86. The VM inventory record 84 may further include a VM resource identifier 88 and a VM location 90. The VM subscription ID 86 indicates the owning service of the service instance 36A1 that made a particular DNS request 44. Similarly, the IP subscription ID 80 indicates the owning service of the service instance 36B1 that has been assigned and is active at the destination IP address.

Within the distributed computing system 10 each service is represented by a globally unique identifier (GUID), referred to as the service identifier. A database is maintained of these GUIDs, and within the database is stored a respective service tree for each service. The service tree for each service includes branching entries for GUIDs of other services that are called by that service. In FIG. 4 the records of this database are shown as service tree records 92. Continuing with FIG. 4, the fleet management system record analyzer 56 (of FIG. 1) is further configured to identify the first service 36A and the second service 36B at least in part by identifying, using a first service tree of service tree records 92, a first service 36A associated with the VM subscription identifier 86 within a timeframe of the DNS request 44 and DNS response 46. Here, a timeframe refers to a time range that ensures that the service tree records 92 are valid at the time which the DNS request 44 and DNS response 46 occurred. The fleet management system record analyzer 56 is further configured to identify the first service 36A and the second service 36B at least in part by identifying, using a second service tree of the service tree data record 92, a second service 36B associated with the IP subscription identifier 80 during the timeframe. To do so, the fleet management system record analyzer 56 may be configured to first identify the first service instance 36A1 linked by the first service tree of the service tree records 92 to the VM subscription ID 86, and then identify the first service 36A linked to the first service instance 36A1. Likewise, the fleet management system record analyzer 56 may be configured to first identify the second service instance 36B1 linked by the second service tree of the service tree records 92 to the IP subscription ID 80, and then identify the second service 36B linked to the second service instance 36B1. Accordingly, as shown in dashed lines, a service-instance-to-service-instance dependency map is formed, and as indicated in dotted lines, a service-to-service dependency map 64 is formed. As depicted, for each of VM subscription identifier 86 and the IP subscription identifier 80, a plurality of service instances and services may be linked, within the service tree records 92.

In one embodiment, the extracted DNS records 74 and VM inventory records 84 and IP inventory records 78 may be extracted into a data analytics workspace to implement the above-described processing functions. For example, relevant fields from the DNS request log record 50A1 and DNS response records 50B1 may be joined together in a table and indexed by container ID 58 in an initial step, and then relevant fields from the VM inventory record 84 and IP inventory record 78 may be joined to the result, to thereby produce a table from which the VM subscription ID 86 and IP subscription ID 80 may be identified. Thus, the analysis server 12 can use the VM inventory record 84 and the IP inventory record 78, by joining the two data sets with each other to determine the particular VM that made a DNS request that was resolved to the destination IP address.

Figure 5:
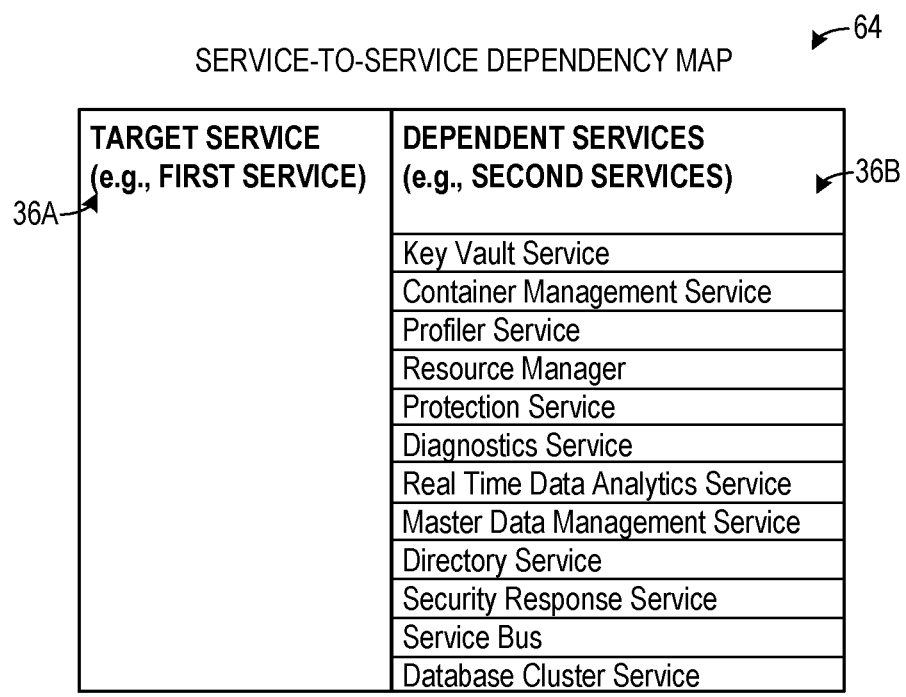
FIG. 5 shows an example service-to-service dependency map created by the computing system of FIG. 1.

FIG. 5 illustrates an example service-to-service dependency map 64 created by the computing system 10 of FIG. 1. Although in the examples described above a first service 36A was linked to a second service 36B, in the example of FIG. 5, for a particular target service as the first service 36A, a plurality of second services 36B are identified by the techniques described above as being dependent on the first service 36A.

FIG. 6 illustrates a multi-level service-to-service dependency map 64A, with a fault diagnosis. Heretofore, first order dependencies have been discussed. First order dependences are illustrated in FIG. 6 at left, and are similar to the dependencies identified in FIG. 5. In addition, each of the first order dependent services is checked for its dependent services using the techniques described above, to thereby produce second order dependent services. In turn, each of the second order dependent services can be analyzed to determine its dependent services, which are third order dependent services relative to the target service. In this way, a multi-level service-to-service dependency map 64A including a plurality of orders of dependency can be generated. Such a map can be useful for diagnosing the true cause of service outages. For example, an example fault diagnosis 68A is illustrated in dotted lines, showing how an error detected in the target service can be traced using the service dependency map through the first order dependent service "Container Mgmt Srvc", and through the second order dependent service "Service D", to the third order dependent services "Service G". As Service G has no dependent services, this service can be determined to be the origin of the fault that caused the error experienced by the target service.

FIG. 7 illustrates a multi-level service-to-service dependency map 64A similar to FIG. 6, and shows how it can be used to generate a recovery schedule 68B. To correct the fault discussed above in relation to FIG. 6, the services can be scheduled for restart in reverse order of dependency. Thus, the third order dependency services that show an error (i.e., Service G) can be scheduled for restarting first, second order dependent services showing an error (i.e., Service D) can be scheduled for restart next, first order dependent services showing an error (i.e., Container Mgmt Srvc) can be restarted next, and finally the target service can be restarted. In this way, at the time of restart, each service will have its dependent services available to it, and post-restart errors will be reduced.

FIG. 8 illustrates an example of a chart indicating a geographic scope of dependent services 68C that can be output by the computing system of FIG. 1. Dependent services of a first service are listed at left in FIG. 8, followed by an indication of the geographic region in which the servers instantiating the server instances implementing the dependent services are located. The locations of the dependent services may be ascertained from the IP inventory record, which can include geographic location information for each destination IP 59. The geographic scope of dependent services 68C may be used to ensure compliance with regulations governing the geographic location of processing and storage of certain data by the computing system 10.

Figure 9:
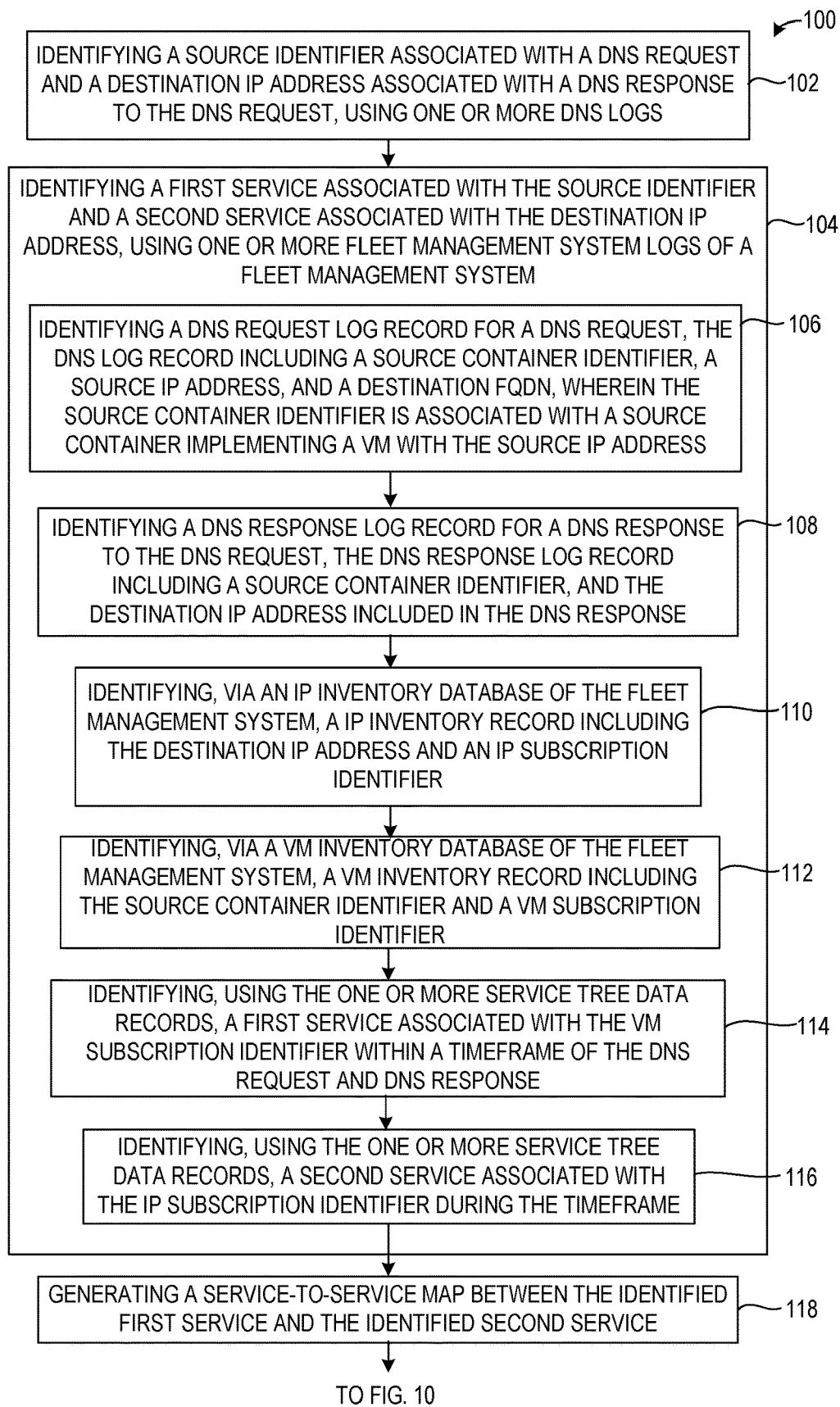
FIG. 9 is a flowchart of a method for use in creating a service-to-service dependency map from domain name server (DNS) logs and fleet management system logs, according to one example implementation.

Turning now to FIG. 9, a flowchart of a method 100 according to one example implementation of the present disclosure is shown. Method 100 can be implemented using the hardware and software described above, or using other suitable hardware and software, as desired. At 102, the method 100 includes identifying a source identifier associated with a DNS request and a destination IP address associated with a DNS response to the DNS request, using one or more DNS logs. At 104, the method 100 includes identifying a first service associated with the source identifier and a second service associated with the destination IP address, using one or more fleet management system logs of a fleet management system. Step 104 may be accomplished at least in part by implementing the substeps 106-114. It will be appreciated that the source identifier may be a source container identifier or a virtual machine identifier as described above. Substeps 106-114 describe an implementation of method 100 in which the source container identifier is used as the source identifier.

At 106, method 100 further includes, identifying, within a DNS request log of the one or more DNS logs, a DNS request log record for a DNS request. The DNS log record includes a source container identifier as the source identifier, a source internet protocol (IP) address, and a destination fully qualified domain name (FQDN). The source container identifier is associated with a source container implementing a virtual machine on a computer, such as a server, that has been assigned the source IP address.

At 108, method 100 further includes identifying, within records from a DNS response log of the one or more DNS logs, a DNS response log record for a DNS response to the DNS request. The DNS response log record includes the source container identifier, and the destination IP address included in the DNS response.

At 110, method 100 further includes identifying, via an IP inventory database of the fleet management system, an IP inventory record including the destination IP address and an IP subscription identifier.

At 112, method 100 further includes identifying, via a VM inventory database of the fleet management system, a VM inventory record including the source container identifier and a VM subscription identifier.

At 114, method 100 further includes identifying, using one or more service tree data records, a first service associated with the VM subscription identifier within a timeframe of the DNS request and DNS response.

At 116, method 100 includes identifying, using the one or more service tree data records, a second service associated with the IP subscription identifier during the timeframe.

At 118, method 100 includes generating a service-to-service dependency map between the identified first service and the identified second service.

Figure 10:
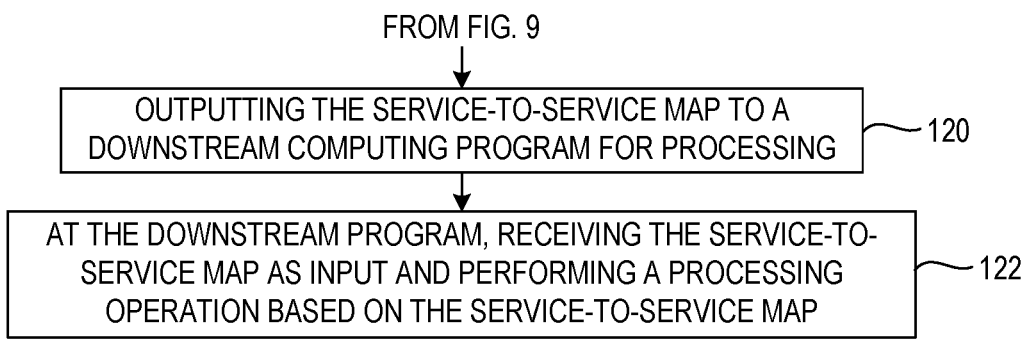
FIG. 10 is a continuation of the flowchart of the method of FIG. 9.

Continuing to FIG. 10, at 120 method 100 includes outputting the service-to-service dependency map to a downstream computing program for processing. The downstream computing program can be a fault diagnosis program, recovery program, or a geographic compliance program, for example. At 122, the method further includes receiving the service-to-service dependency map as input at the downstream program, and performing a processing operation based on the service-to-service dependency map. As discussed above, the downstream program can be a recovery program configured to compute a recovery schedule for restarting services based on the service-to-service dependency map as the processing result, a fault diagnosis program configured to generate a fault diagnosis based on the service-to-service dependency map as the processing result, or a geographic compliance program configured to determine a geographic scope of a location of servers executing the first service and the second service as the processing result, for example. Other types of downstream program may also be utilized.

The systems and methods described above can be used to programmatically and efficiently generate a service-to-service dependency map for services implemented across distributed computing systems with virtualized environments having container or hypervisor architectures. A programmatically generated service-to-service dependency map can be generated for each phase in the lifecycle of an application, such as at build, development, testing, deployment, and retirement phases. Further, the service-to-service dependency map can be kept up to date through periodic automatic updating, to aid in time sensitive fault diagnosis and recovery scheduling. Further, the timing of the service-of-service dependency map can be re-computed with sufficient frequency to aid in regulatory compliance, for example, to geographic restrictions on data storage and processing in certain jurisdictions.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
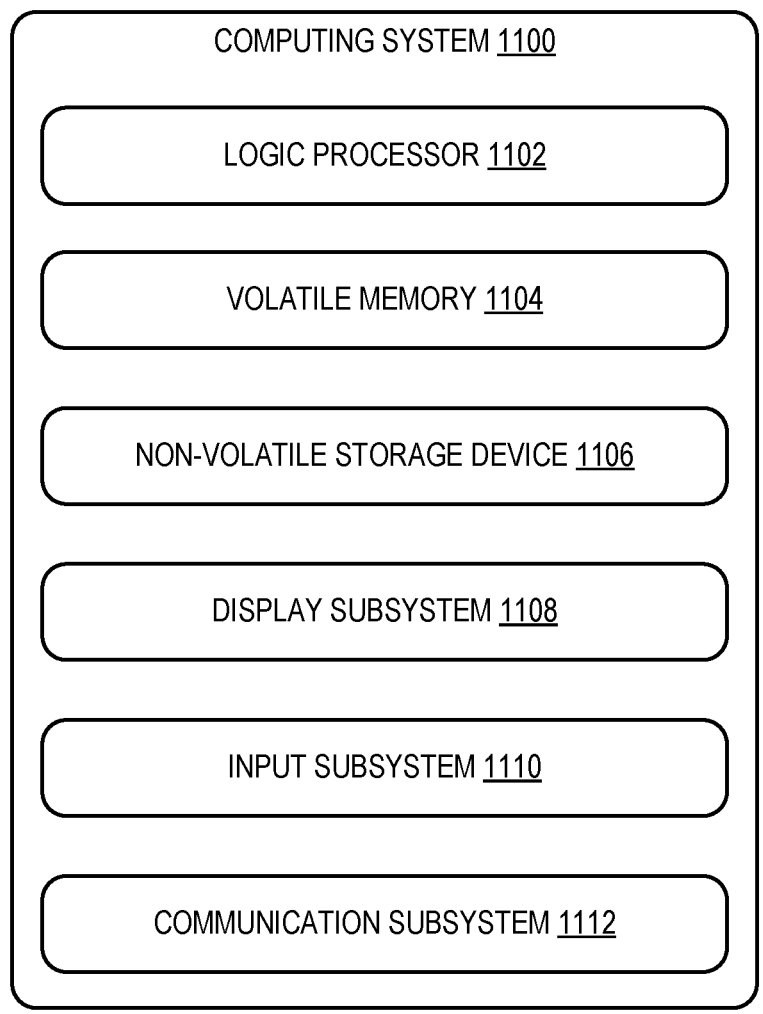
FIG. 11 shows a schematic view of an example computing environment in which the computing system of FIG. 1 may be enacted.

FIG. 11 schematically shows a non-limiting embodiment of a computing system 1100 that can enact one or more of the methods and processes described above. Computing system 1100 is shown in simplified form. Computing system 1100 may embody any of the servers in distributed computing system 10 described above and illustrated in FIGS. 1 and 2.

Computing system 1100 includes a logic processor 1102, volatile memory 1104, and a non-volatile storage device 1106. Computing system 1100 may optionally include a display sub system 1108, input sub system 1110, communication subsystem 1112, and/or other components not shown in FIG. 11.

Logic processor 1102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1106 includes one or more physical devices configured to hold instructions executable by the logic processors to implement the methods and processes described herein. When such methods and processes are implemented, the state of non-volatile storage device 1106 may be transformed—e.g., to hold different data.

Non-volatile storage device 1106 may include physical devices that are removable and/or built in. Non-volatile storage device 1106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1106 may include nonvolatile, dynamic, static, read/write, read-only, sequential-access, location-addressable, file-addressable, and/or content-addressable devices. It will be appreciated that non-volatile storage device 1106 is configured to hold instructions even when power is cut to the non-volatile storage device 1106.

Volatile memory 1104 may include physical devices that include random access memory. Volatile memory 1104 is typically utilized by logic processor 1102 to temporarily store information during processing of software instructions. It will be appreciated that volatile memory 1104 typically does not continue to store instructions when power is cut to the volatile memory 1104.

Aspects of logic processor 1102, volatile memory 1104, and non-volatile storage device 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 typically implemented in software by a processor to perform a particular function using portions of volatile memory, which function involves transformative processing that specially configures the processor to perform the function. Thus, a module, program, or engine may be instantiated via logic processor 1102 executing instructions held by non-volatile storage device 1106, using portions of volatile memory 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1108 may be used to present a visual representation of data held by non-volatile storage device 1106. The visual representation may take the form of a graphical user interface (GUI).

When included, input subsystem 1110 may comprise or interface with one or more user-input devices such as a keyboard, mouse, touch screen, camera, and microphone.

When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wired or wireless local- or wide-area network. In some embodiments, the communication subsystem may allow computing system 1100 to send and/or receive messages to and/or from other devices via a network such as the Internet.

The following paragraphs provide additional description of aspects of the present disclosure. One aspect provides a computing system. The computing system may comprise a processor and memory storing instructions that cause the processor to execute a domain name service (DNS) log analyzer configured to identify a source identifier associated with a DNS request and a destination internet protocol (IP) address associated with a DNS response to the DNS request, using one or more DNS logs; a fleet management system record analyzer configured to identify a first service associated with the source identifier and a second service associated with the destination IP address, using one or more system logs of a fleet management system; and a dependency map generator configured to generate a service-to-service dependency map between the identified first service and the identified second service.

In this aspect, additionally or alternatively, the source identifier may be a source container identifier, and the DNS log analyzer may be configured to identify the source container identifier at least in part by identifying within a DNS request log of the one or more DNS logs a DNS request log record for a DNS request, the DNS log record including the source container identifier, a source IP address, and a destination fully qualified domain name, wherein the source container identifier may be associated with a source container implementing a virtual machine (VM) on a computer that has been assigned the source IP address.

In this aspect, additionally or alternatively, the DNS log analyzer may be further configured to identify the source container identifier at least in part by identifying within records from a DNS response log of the one or more DNS logs, a DNS response log record for a DNS response to the DNS request, the DNS response log record including the destination IP address included in the DNS response.

In this aspect, additionally or alternatively, the fleet management system record analyzer may be configured to identify the first service and the second service at least in part by identifying, via an IP inventory database of the fleet management system, an IP inventory record including the destination IP address, an IP subscription identifier, and a resource identifier.

In this aspect, additionally or alternatively, the fleet management system record analyzer may be further configured to identify the first service and the second service at least in part by identifying, via a VM inventory database of the fleet management system, a VM inventory record including the container identifier and a VM subscription identifier.

In this aspect, additionally or alternatively, the fleet management system record analyzer may be further configured to identify the first service and the second service at least in part by identifying, using one or more service tree data records, a first service associated with the VM subscription identifier within a timeframe of the DNS request and DNS response.

In this aspect, additionally or alternatively, the fleet management system record analyzer may be further configured to identify the first service and the second service at least in part by identifying, using the one or more service tree data records, a second service associated with the IP subscription identifier during the timeframe, and identifying, using the one or more service tree data records, a location of service and a service name for the second service.

In this aspect, additionally or alternatively, the service-to-service dependency map may be output to a downstream computing program for processing. In this aspect, additionally or alternatively, the downstream computing program may be selected from the group consisting of a fault diagnosis program, recovery program, and a geographic compliance program.

Another aspect provides a computing method. The computing method may comprise identifying a source identifier associated with a domain name server (DNS) request and a destination internet protocol (IP) address associated with a DNS response to the DNS request, using one or more DNS logs; identifying a first service associated with the source identifier and a second service associated with the destination IP address, using one or more fleet management system logs of a fleet management system; and generating a service-to-service dependency map between the identified first service and the identified second service.

In this aspect, additionally or alternatively, the source identifier may be a source container identifier, and identifying the source container identifier may be accomplished at least in part by identifying within a DNS request log of the one or more DNS logs a DNS request log record for a DNS request, the DNS log record including the source container identifier, a source IP address, and a destination fully qualified domain name, wherein the source container identifier may be associated with a source container implementing a virtual machine (VM) on a computer that has been assigned the source IP address.

In this aspect, additionally or alternatively, identifying the source container identifier may be accomplished at least in part by identifying within a DNS response log of the one or more DNS logs a DNS response log record for a DNS response to the DNS request, the DNS response log record including the destination IP address included in the DNS response.

In this aspect, additionally or alternatively, identifying the first service and the second service may be accomplished at least in part by identifying, via an IP inventory database of the fleet management system, an IP inventory record including the destination IP address, an IP subscription identifier, and a resource identifier.

In this aspect, additionally or alternatively, identifying the first service and the second service may be accomplished at least in part by identifying, via a VM inventory database of the fleet management system, a VM inventory record including the source container identifier and a VM subscription identifier.

In this aspect, additionally or alternatively, identifying the first service and the second service may be accomplished at least in part by identifying, using a service tree data record, a first service associated with the VM subscription identifier within a timeframe of the DNS request and DNS response.

In this aspect, additionally or alternatively, the file integrity monitoring system record analyzer may be further configured to identify the first service and the second service at least in part by identifying, using a service tree data record, a second service associated with the IP subscription identifier during the timeframe, and identifying, using the one or more service tree data records, a location of service and a service name for the second service.

In this aspect, additionally or alternatively, the method may further comprise outputting the service-to-service dependency map to a downstream computing program for processing. In this aspect, additionally or alternatively, the downstream computing program may be selected from the group consisting of a fault diagnosis program, recovery program, and a geographic compliance program.

Another aspect provides a computing system. The computing system may comprise a processor and memory storing instructions that cause the processor to execute a domain name service (DNS) log analyzer, a fleet management record analyzer, a dependency map generator, and a downstream program. The domain name service (DNS) log analyzer configured to identify within a DNS request log a DNS request log record for a DNS request, the DNS log record including a source container identifier, a source internet protocol (IP) address, and a destination fully qualified domain name, wherein the source container identifier may be associated with a source virtual machine (VM) on a computer that has been assigned the source IP address; and identify within records from a DNS response log a DNS response log record for a DNS response to the DNS request, the DNS response log record including the source container identifier, and a destination IP address included in the DNS response. The fleet management record analyzer may be configured to identify, via an IP inventory database of a fleet management system, an IP inventory record including the destination IP address and an IP subscription identifier; identify, via an VM inventory database of the fleet management system, an VM inventory record including the source container identifier and a VM subscription identifier; identify, using a service tree data record, a first service associated with the VM subscription identifier within a timeframe of the DNS request and DNS response; and identify, using a service tree data record, a second service associated with the IP subscription identifier during the timeframe. The dependency map generator may be configured to generate a service-to-service dependency map between the identified first service and the identified second service. The downstream program may be configured to receive the service-to-service dependency map as input, perform a processing operation based on the service-to-service dependency map, and output a processing result of the processing operation.

In this aspect, additionally or alternatively, the downstream program may be selected from the group consisting of a recovery program configured to compute a recovery schedule for restarting services based on the service-to-service dependency map as the processing result, a fault diagnosis program configured to generate a fault diagnosis based on the service-to-service dependency map as the processing result, and a geographic compliance program configured to determine a geographic scope of a location of servers executing the first service and the second service as the processing result.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a processor and memory storing instructions that cause the processor to execute:
 a domain name service (DNS) log analyzer configured to identify a source identifier associated with a DNS request and a destination internet protocol (IP) address associated with a DNS response to the DNS request, using one or more DNS logs;
 a fleet management system record analyzer configured to identify a first service associated with the source identifier and a second service associated with the destination IP address, using one or more system logs of a fleet management system; and
 a dependency map generator configured to generate a service-to-service dependency map between the identified first service and the identified second service.

2. The computing system of claim 1, wherein
the source identifier is a source container identifier; and
the DNS log analyzer is configured to identify the source container identifier at least in part by:
 identifying within a DNS request log of the one or more DNS logs a DNS request log record for a DNS request, the DNS log record including the source container identifier, a source IP address, and a destination fully qualified domain name, wherein the source container identifier is associated with a source container implementing a virtual machine (VM) on a computer that has been assigned the source IP address.

3. The computing system of claim 2, wherein the DNS log analyzer is further configured to identify the source container identifier at least in part by:
 identifying within records from a DNS response log of the one or more DNS logs, a DNS response log record for a DNS response to the DNS request, the DNS response log record including the destination IP address included in the DNS response.

4. The computing system of claim 3, wherein the fleet management system record analyzer is configured to identify the first service and the second service at least in part by:
 identifying, via an IP inventory database of the fleet management system, an IP inventory record including the destination IP address, an IP subscription identifier, and a resource identifier.

5. The computing system of claim 4, wherein the fleet management system record analyzer is further configured to identify the first service and the second service at least in part by:
 identifying, via a VM inventory database of the fleet management system, a VM inventory record including the container identifier and a VM subscription identifier.

6. The computing system of claim 5, wherein the fleet management system record analyzer is further configured to identify the first service and the second service at least in part by:
 identifying, using one or more service tree data records, a first service associated with the VM subscription identifier within a timeframe of the DNS request and DNS response.

7. The computing system of claim 6, wherein the fleet management system record analyzer is further configured to identify the first service and the second service at least in part by:
 identifying, using the one or more service tree data records, a second service associated with the IP subscription identifier during the timeframe; and
 identifying, using the one or more service tree data records, a location of service and a service name for the second service.

8. The computing system of claim 1, wherein
the service-to-service dependency map is output to a downstream computing program for processing.

9. The computing system of claim 8, wherein the downstream computing program is selected from the group consisting of a fault diagnosis program, recovery program, and a geographic compliance program.

10. A computing method, comprising:
identifying a source identifier associated with a domain name server (DNS) request and a destination internet protocol (IP) address associated with a DNS response to the DNS request, using one or more DNS logs;
identifying a first service associated with the source identifier and a second service associated with the destination IP address, using one or more fleet management system logs of a fleet management system; and
generating a service-to-service dependency map between the identified first service and the identified second service.

11. The computing method of claim 10, wherein
the source identifier is a source container identifier; and
identifying the source container identifier is accomplished at least in part by:
identifying within a DNS request log of the one or more DNS logs a DNS request log record for a DNS request, the DNS log record including the source container identifier, a source IP address, and a destination fully qualified domain name, wherein the source container identifier is associated with a source container implementing a virtual machine (VM) on a computer that has been assigned the source IP address.

12. The computing method of claim 11, wherein identifying the source container identifier is accomplished at least in part by:
identifying within a DNS response log of the one or more DNS logs a DNS response log record for a DNS response to the DNS request, the DNS response log record including the destination IP address included in the DNS response.

13. The computing method of claim 12, wherein identifying the first service and the second service is accomplished at least in part by:
identifying, via an IP inventory database of the fleet management system, an IP inventory record including the destination IP address, an IP subscription identifier, and a resource identifier.

14. The computing method of claim 13, wherein identifying the first service and the second service is accomplished at least in part by:
identifying, via a VM inventory database of the fleet management system, a VM inventory record including the source container identifier and a VM subscription identifier.

15. The computing method of claim 14, wherein identifying the first service and the second service is accomplished at least in part by:
identifying, using a service tree data record, a first service associated with the VM subscription identifier within a timeframe of the DNS request and DNS response.

16. The computing method of claim 15, wherein the file integrity monitoring system record analyzer is further configured to identify the first service and the second service at least in part by:
identifying, using a service tree data record, a second service associated with the IP subscription identifier during the timeframe; and
identifying, using the one or more service tree data records, a location of service and a service name for the second service.

17. The computing method of claim 10, further comprising:
outputting the service-to-service dependency map to a downstream computing program for processing.

18. The computing method of claim 17, wherein the downstream computing program is selected from the group consisting of a fault diagnosis program, recovery program, and a geographic compliance program.

19. A computing system, comprising:
a processor and memory storing instructions that cause the processor to execute:
a domain name service (DNS) log analyzer configured to:
identify within a DNS request log a DNS request log record for a DNS request, the DNS log record including a source container identifier, a source internet protocol (IP) address, and a destination fully qualified domain name, wherein the source container identifier is associated with a source virtual machine (VM) on a computer that has been assigned the source IP address; and
identify within records from a DNS response log a DNS response log record for a DNS response to the DNS request, the DNS response log record including the source container identifier, and a destination IP address included in the DNS response;
a fleet management record analyzer configured to:
identify, via an IP inventory database of a fleet management system, an IP inventory record including the destination IP address and an IP subscription identifier;
identify, via an VM inventory database of the fleet management system, an VM inventory record including the source container identifier and a VM subscription identifier;
identify, using a service tree data record, a first service associated with the VM subscription identifier within a timeframe of the DNS request and DNS response; and
identify, using a service tree data record, a second service associated with the IP subscription identifier during the timeframe;
a dependency map generator configured to:
generate a service-to-service dependency map between the identified first service and the identified second service; and
a downstream program configured to:
receive the service-to-service dependency map as input;
perform a processing operation based on the service-to-service dependency map; and
output a processing result of the processing operation.

20. The computing system of claim 19, wherein the downstream program is selected from the group consisting of a recovery program configured to compute a recovery schedule for restarting services based on the service-to-service dependency map as the processing result, a fault diagnosis program configured to generate a fault diagnosis based on the service-to-service dependency map as the processing result, and a geographic compliance program configured to determine a geographic scope of a location of servers executing the first service and the second service as the processing result.

* * * * *